Sept. 3, 1963 W. A. STAMPLER 3,102,994

GATING CIRCUIT

Filed April 29, 1960 2 Sheets-Sheet 1

INVENTOR.
WILLIAM A. STAMPLER

BY William E. Cleaver

ATTORNEY

INVENTOR.
WILLIAM A. STAMPLER
BY William E. Cleaver
ATTORNEY 3,102,994
Patented Sept. 3, 1963

3,102,994

GATING CIRCUIT

William A. Stampler, Hatboro, Pa., assignor to Burroughs Corporation, Detroit, Mich., a corporation of Michigan Filed Apr. 29, 1960, Ser. No. 25,737
6 Claims. (Cl. 340—146.2)

This invention relates to gating circuits and more particularly to an EXCLUSIVELY-OR circuit.

The use of gating circuits in the design of switching circuits is well-known. One of the gating circuits used is the EXCLUSIVELY-OR gate (sometimes called the AND-NOT gate). Such a gating device operates with two signals A and B such that if either A or B is true, but not both true, the gate will pass the true signal, or provide a selected signal, which indicates the relative status of the signals A and B.

In the prior art, EXCLUSIVELY-OR circuits have been of the type described on page 411 of the text, "Pulse and Digital Circuits," by Drs. J. Millman and H. Taub, published by McGraw-Hill, 1956. Such an EXCLUSIVELY-OR circuit provides means for generating a detection signal if either signal is true, and further means for inhibiting the detection signal, if in fact both signals are true. With this arrangement it is necessary to have a separate decision circuit for each pair of signals being compared. Therefore, if a device is provided which compares two words or numbers each having N bits, it is necessary to provide N individual decision circuits, and in addition an over-all decision circuit, the latter to be responsive to the output signals of the N individual decision circuits.

The present invention lends itself to a system which can compare two sets of N bit signals and which needs fewer components to perform the comparison than does a system, such as described above, which has N decision circuits.

It is an object of the present invention to provide an improved EXCLUSIVELY-OR circuit.

It is a further object of the present invention to provide an EXCLUSIVELY-OR circuit, for use in comparing two sets of N bit-signals, which provides a saving of components in its fabrication.

In accordance with a feature of the present invention there is provided a signal averaging means, which in a preferred embodiment is a voltage divider, and a signal coincidence means, which in a preferred embodiment is an AND gate, for each pair of bit-signals to be compared. For a pair of bit-signals which are being compared with each other, the voltage divider provides an algebraic average signal. If the average signal is equal to a first binary value, for instance, a binary ZERO, then the determination of this average signal enables the system to recognize that both of the input signals are in fact binary ZEROS. On the other hand, the signal coincidence means is arranged to be responsive if both of the input signals have a value equal to a binary ONE, or the second binary value.

In accordance with another feature of the present invention there is provided means to detect when any average signal from any pair of signals being compared is not equal to a selected binary value, which in a preferred embodiment is binary ZERO, and further to detect when any of the coincidence means is responsive to a different selected binary value, which in a preferred embodiment is a binary ONE.

The foregoing and other objects and features of this invention will be best understood by reference to the following description of an embodiment of the invention taken in conjunction with the accompanying drawings, wherein FIG. 1 is a schematic block diagram of a prior art EXCLUSIVELY-OR circuit;

In general the present invention functions to determine if two binary digit signals, which are being compared with one another, have either the same positive or the same negative value. Obviously if there is no detection of either equal positive or equal negative values for the two compared bit-signals, the signals must have values different from one another and one bit signal must be "true." The qualification of "true" is defined by the system designer or the user as either binary ONE or binary ZERO.

Figure 3:
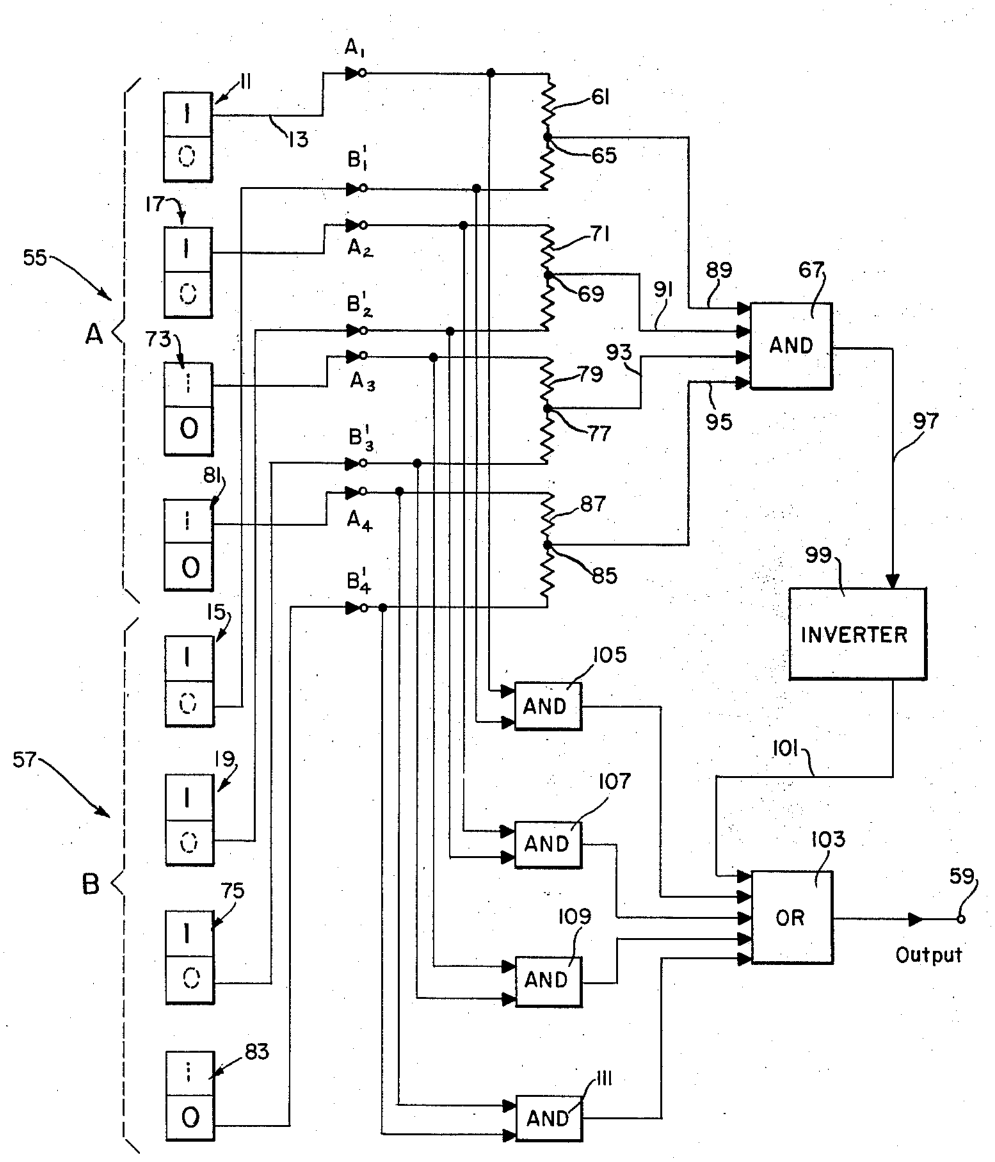
FIG. 3 is a schematic block diagram of an embodiment of the present invention used to compare two sets of N bit-signals.

Some basic principles should be reviewed before the detailed operation of the circuit is considered. A bistable device such as a flip-flop can be conducting on its ONE side or conducting on its ZERO side. The output signal sampled on the conducting side, when either side of the flip-flop conducts, is normally the same voltage value. However, if the output signal is sampled only on a single side then the value of the output signal has a first value when the sampled side conducts and a second value when the sampled side is not conducting. Therefore the output signal from the sampled side represents the status of the bistable device. In other words, assume that flip-flop 11 of FIG. 3 is sampled only on its ONE side. Further assume that when flip-flop 11 conducts on its ONE side its output signal as transmitted on line 13 is −6 volts, and when there is no conduction on its ONE side (the flip-flop being in the ZERO state), the output signal appearing on line 13 is 0 volt. It becomes evident that flip-flop 11 is in its ONE state when it provides a −6 volt output signal on line 13 and is in its ZERO state when a 0 volt output signal is provided on line 13.

In accordance with the discussion thus far, it can be seen that signal values from a sampled side can designate the binary state of a flip-flop, and for purposes of explanation, voltage values for the bit signals have been assigned. Only one other basic consideration need be made before examining the invention in detail. When two binary words or numbers, each having N bits are to be compared, each bit of the first word is compared with its corresponding bit of the second word. Again referring to FIG. 3, such a comparison would be: between the bit represented by flip-flop 11 and the bit represented by flip-flop 15; between the bit represented by flip-flop 17 and the bit represented by flip-flop 19, and so on.

In accordance with the principles of the present invention only one signal processing device, designated as the first gating device, is necessary to determine when both of the bit-signals of any compared pair have equal negative values or unequal values. This is accomplished by providing an average signal for each pair of compared signals and, in a preferred embodiment, providing an AND gate as the first gating device. Consider the binary values equal to 0 volt and −6 volts, and further consider that the first gating device is responsive only to all inputs being 0 volt. The average signal in accordance with these values can be 0 volt when both of the compared signals are 0 volt; −3 volts when one of the signals is −6 volts and the other is 0 volt; and −6 volts if both signals are −6 volts. If each average signal for each pair of signals compared is transmitted to the first gating device and any average signal thereof is other than 0 volt the gate it non-responsive and the output signal from the gate provides a first indication that at least two compared bit signals have different values or a second indication that they have equal negative values. If in fact the gate is rendered non-responsive because both of the input signals have equal negative values, the indication signal from the first gating device would be a spurious output signal for the system since an EXCLUSIVELY-OR circuit should provide a signal only when the compared signals have different values. Therefore to each pair of input signal means there is connected a coincidence device which responds to two negative input signals. If, in fact, the first gating device is non-responsive because two of the compared signals have equal negative values, the indication that they are unequal is corrected because at least one coincidence device will provide an output signal indicating they have equal negative values.

Figure 1:
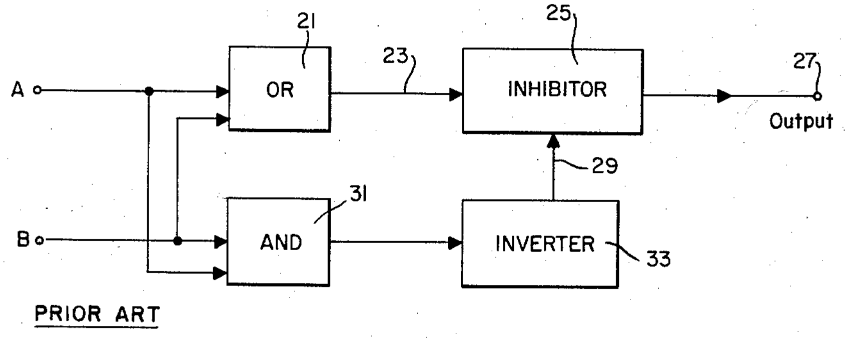

Referring to FIG. 1 there is shown a schematic block diagram of an EXCLUSIVELY-OR circuit as described in the text "Pulse and Digital Circuits" mentioned above. Description of typical AND gates, OR gates and inverters as discussed throughout the specification can be found in the text "Pulse and Digital Circuits." In this prior art EXCLUSIVELY-OR circuit the signals to be compared are transmitted to OR gate 21 whereat a determination is made to detect if either signal is "true." If either signal is "true" the OR gate 21 provides an indicating signal on line 23 which is transmitted to inhibitor 25. Inhibitor 25 passes the indicating signal to the output terminal 27 if there is no inhibiting signal received on line 29. If, in fact, both signals A and B are "true" OR gate 21 will provide the indicating signal on line 23, but such an indicating signal under these conditions if transmitted to the output terminal 27 would give a false indication since the EXCLUSIVELY-OR circuit should only provide an output signal if either A or B is "true" but not if both A and B are "true." In order to prevent the false indication the AND gate 31 is provided and is responsive to two "true" signals. In response to the two "true" signals AND gate 31 transmits an inhibiting signal to inverter 33 which inverts the signal and further transmits it to inhibitor 25. This inhibiting signal acts to stop the indicating signal from passing through the inhibitor to the output terminal 27. If the EXCLUSIVELY-OR circuit as shown in FIG. is used as a building block to provide an EXCLUSIVELY-OR circuit which compares two binary digit words each having N bits, then for each pair of bits to be compared it becomes necessary to have an additional number of components equal to the number of components shown in FIG. 1. In other words, if there were four bits in each word to be compared the over-all EXCLUSIVELY-OR circuit in the prior art would have four OR gates such as OR gate 21; plus one OR gate to sample each circuit's output; four AND gates such as AND gate 31; four inverters such as inverter 33; and four inhibitors such as inhibitor 25. It is evident then that an EXCLUSIVELY-OR circuit to be used with four bit words would require 17 major components if the prior art design is employed.

Figure 2:
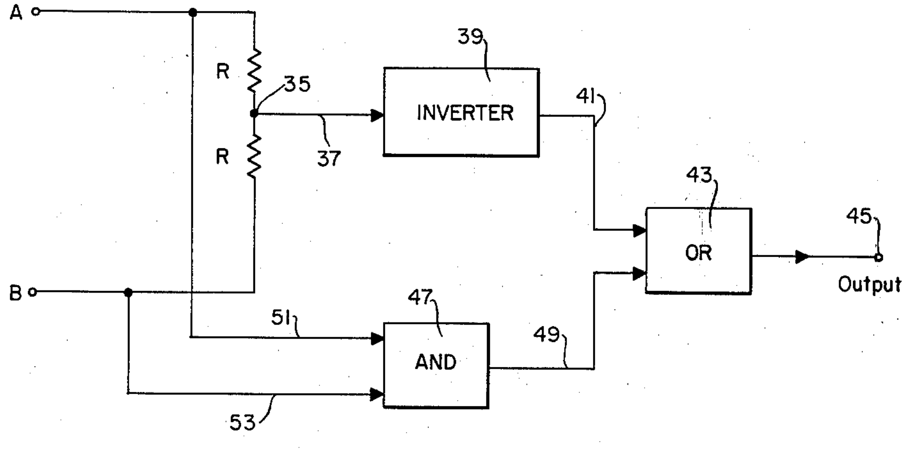
FIG. 2 is a schematic block diagram of an embodiment of the present invention used to compare a pair of bit-signals.

Referring to FIG. 2 there is shown a schematic block diagram of the basic EXCLUSIVELY-OR circuit of the present invention. In accordance with the previous discussion assume that the signals to be compared will have a value of either 0 volt or −6 volts and the ground rule is that if the signals are equal there will be a −6 volt output and if the signals are unequal there will be a 0 volt output. In FIG. 2 if signals A and B are both equal to 0 volt, the average signal as seen at point 35 will be 0 volt. This 0 volt signal will be transmitted on line 37 to the inverter 39 whereat it is inverted to provide a −6 volt signal on line 41. The OR gate 43 will provide an output signal at terminal 45 in accordance with its most negative input signal. The AND gate 47 is responsive to two negative input signals and when responsive provides a negative output signal on line 49. Considering again now that the two signals A and B in the first example are each 0 volt, the AND gate 47 will not be responsive and therefore there will be a positive signal provided on line 49. Since as described before a −6 volt signal has been provided on line 41 the OR gate 43 will provide a −6 volt signal at terminal 45. Next consider the condition when A and B are unequal, one signal being equal to 0 volt and the other signal being equal to −6 volts. Under this last condition, point 35 will have an average value of −3 volts. The −3 volt average signal will be transmitted on line 37 to inverter 39 whereat it will be inverted to provide a 0 volt or positive voltage signal on line 41. Since at least one of the signals A or B is equal to 0 volt in this second example the AND gate 47 will not be responsive and therefore there will be a positive voltage signal on line 49 which is also transmitted to the OR gate 43. Since OR gate 43 has two positive voltage input signals thereto the output signal at terminal 45 will be a positive voltage signal, or 0 volt. Next consider the situation when the signals A and B are both −6 volts. In this situation the average signal at point 35 is −6 volts and this average signal is transmitted via line 37 to inverter 39 whereat it is inverted to provide a positive voltage signal, or 0 volt on line 41. If this positive voltage signal appearing on line 41 were transmitted through the OR gate to terminal 45 this would be a false indication since the signals A and B in this last situation are equal, each having a value of −6 volts. Such an erroneous indication at terminal 45 is prevented since the two −6 volt signals are applied via the lines 51 and 53 to the AND gate 47. As was mentioned earlier AND gate 47 responds to two negative voltage input signals to provide a negative voltage output signal on line 49. With the negative output signal on line 49 being transmitted to the OR gate 43, the OR gate follows this negative voltage input and provides a −6 volt output signal on terminal 45. In review it becomes evident that if the signals A and B are equal, either in a positive voltage or a negative voltage sense, the output signal at terminal 45 will be −6 volts, and if the signals A and B are unequal with one signal being "true" the output signal at terminal 45 will be 0 volt.

It is clear from comparing the prior art EXCLUSIVELY-OR circuit of FIG. 1 and the inventive EXCLUSIVELY-OR circuit of FIG. 2 that there is one less block component or logical component used in the inventive circuit of FIG. 2. If each of the devices 21, 31 and 25 in FIG. 1 uses at least two diodes it becomes evident that there is a saving of two diodes when the two building blocks are compared. However there is an even greater saving when the building block of FIG. 2 is used to provide an EXCLUSIVELY-OR circuit for comparing N sets of binary digit signals, as will become evident from the discussion of FIG. 3.

In FIG. 3 there is shown a schematic block diagram of an EXCLUSIVELY-OR circuit to be used to compare two words A and B. Each word A and B has four bits as represented by the four flip-flops 55 for the word A, and four flip-flops 57 for the word B. To illustrate flexibility the EXCLUSIVELY-OR circuit of FIG. 3 is arranged to provide an output signal at terminal 59 which will be 0 volt if the two words are equal and −6 volts if they are unequal. It will be recalled that this is a variation from the output signals at terminal 45 of FIG. 2. In order to accomplish this variation each voltage divider such as voltage divider 61 is connected to the ONE side of the flip-flops 55 and to the 0 sides of the corresponding flip-flops 57.

By way of illustration consider that the word A is really the numeral "3," and accordingly is binary-coded 1–1–0–0. These coded numbers have been designated by solid line numerals within the flip-flops. Consider that the word B is the numeral "7," and accordingly is binary-coded 1–1–1–0. This binary-coded number has also been designated by solid line numerals in the flip-flops 57. Examine now the operation of the circuit in FIG. 3 when the word A, numeral "3," is compared with the word B, numeral "7." The first two bits to be compared are the bit stored in the flip-flop 11 and the bit stored in the flip-flop 15. The voltage divider 61 is connected to the ONE side of flip-flop 11 and when conducting (as is flip-flop 11) on its ONE side there is provided a −6 volts to the top side of voltage divider 61. The bottom side of the voltage divider 61 is connected to the ZERO side of flip-flop 15 which is not conducting and therefore there is 0 volt applied to the bottom side of voltage divider 61. As a result of having −6 volts on the top side and 0 volt on the bottom side the average voltage seen at point 65 is −3 volts. This average signal of −3 volts is transmitted to become one of the inputs to the AND gate 67. When the second two binary digit signals are compared the average signal appearing at point 69 of voltage divider 71 is also −3 volts since the flip-flops 17 and 19 to which the voltage divider 71 is connected, are in the same states as were the flip-flops 11 and 15 previously described. When the third pair of binary digits as represented by the flip-flops 73 and 75 is compared the average voltage appearing at point 77 of voltage divider 79 will be 0 volt since the ONE side of flip-flop 73 is not conducting and the 0 side of flip-flop 75 is not conducting. Lastly, when the two binary digits as represented by the flip-flops 81 and 83 are compared an average signal of −3 volts will be found at point 85 of voltage divider 87 since this voltage divider is connected to a nonconducting ONE side of flip-flop 81 and a conducting 0 side of flip-flop 83. Hence in review we find there is −3 volts on input line 89, −3 volts on input line 91; 0 volt on input line 93; −3 volts on input line 95. The AND gate 67 is an AND gate which is responsive to negative inputs to provide a negative output. Since there is a 0 volt input on line 93, AND gate 67 is not responsive and provides a positive signal on line 97. The positive signal on line 97 is inverted at inverter 99 to provide a negative signal (−6 volts) on line 101. The OR gate 103 will follow its most negative signal and therefore provides a −6 volt output at terminal 59. Each of the AND gates 105, 107, 109 and 111 is responsive to negative input signals to provide a negative output signal. Since none of the pairs were negative in the example just described none of the outputs from the AND gates 105, 107, 109 and 111 is negative. However, as mentioned earlier, the negative signal on line 101 will provide a negative output at terminal 59.

In the example described above it is evident of course, that the numeral "3" is not equal to the numeral "7" and as mentioned earlier, the ground rule for FIG. 3 was to be that if the numerals were unequal there would be a negative output signal at terminal 59. The analysis of the comparison of the two numerals indicates that such a negative signal was in fact produced at terminal 59.

In a second consideration for clarity consider that flip-flop 73 is in fact conducting on its ONE side so that the words A and B are both equal to the numeral "7." In this second case the point 77 would also be equal to −3 volts and therefore the AND gate 67 would be responsive providing a negative signal on line 97, which negative signal would be inverted at inverter 99 to provide a positive signal on line 101. With the positive signal on line 101 and no change in that outputs of the AND gates 105, 107, 109 and 111 the output signal at terminal 59 would be positive or 0 volt. This, too, would be in accordance with the ground rule since the words A and B are equal.

A third example would be a comparison between the word A being equal to the numeral "15" coded as 1–1–1–1, and the word B being equal to ZERO coded 0–0–0–0. In this last example each of the inputs to AND gate 67 would be negative providing a positive signal on line 101 but each of the AND gates 105, 107, 109 and 111 would be providing a negative output signal to OR gate 103 so that there would be a negative output signal at terminal 59 indicating the two words were unequal.

Now if the circuit of FIG. 3 is examined it becomes clear that there is only one inverter used for the overall circuit. There are only eleven major units (the 5 AND gates, 1 OR gate, 1 inverter and 4 voltage dividers) used in the present invention, as compared with seventeen major units (5 OR gates, 4 AND gates, 4 inventers and 4 inhibitors) used with a similar prior art arrangement.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. A circuit for comparing the values of first and second signals wherein each of said signals has a first and a second value comprising: first and second signal input means being adapted to respectively receive said first and second signals; signal averaging means coupled to said first and second signal input means to provide a first indicative signal when the algebraic average of said first and second signals equals said first value; signal coincidence means coupled to said first and second signal input means to provide a second indicative signal when said first and second signals each simultaneously have said second value; comparison signal means coupled to said signal coincidence means and to said signal averaging means to provide a first comparison signal in response to the presence of either said first or said second indicative signal and a second comparison signal when neither said first nor said second indicative signal is received.

2. A circuit for comparing the values of first and second signals wherein each of said signals has a first and a second value comprising: first and second signal input means being adapted to respectively receive said first and second signals; voltage divider means coupled to said first and second signal input means to provide a first indicative signal when the algebraic average of said first and second signals equals said first value; signal coincidence means coupled to said first and second signal input means to provide a second indicative signal when said first and second signals each simultaneously have said second value; comparison signal means coupled to said coincidence means and to said voltage divider means to provide a first comparison signal in response to the presence of either said first or said second indicative signal and a second comparison signal when neither said first nor said second indicative signal is received.

3. A circuit for comparing the values of first and second signals according to claim 2 wherein said signal coincidence means includes an AND gate and wherein said comparison signal means includes a signal inverter device coupled to said voltage divider means and an OR gate coupled to said signal inverter device and said AND gate.

4. A circuit for comparing the values of first and second binary coded words wherein each word is respectively represented by a different set of N bit signals, each of which bit signals of said first word has a corresponding bit signal of said second word and wherein each bit signal has a first and a second value comprising: a set of N first input signal means and a corresponding set of N second input signal means, each of said first input signal means adapted to respectively receive a different assigned first word bit signal and each of said second input signal means adapted to respectively receive a different assigned second word bit signal; a set of signal averaging means, each of which is coupled to a different pair of corresponding first and second input signal means to provide a separate average signal for each pair of corresponding first word and second word bit signals; first signal coincidence means coupled to each of said signal averaging means to provide a first indicative signal when each of said average signals has a value at least equal to or greater than said first value of said bit signals; a set of N second coincidence means each respectively coupled to a different pair of corresponding first and second input signal means to provide second indicative signals if any pair of corresponding first word and second word signals each simultaneously have said second value of said bit signals; and signal gating means being circuitry coupled to said first signal coincidence means and further coupled to each of said second signal coincidence means to provide a first comparison signal in response to the presence of either of said first or second indicative signals and a second comparison signal in response to the absence of said first and second indicative signals.

5. A circuit for comparing the values of first and second binary coded words according to claim 4 wherein each of said signal averaging means comprises a resistance voltage divider and wherein said signal coincidence devices comprise AND gates.

6. A circuit for comparing the values of first and second binary coded words according to claim 4 wherein said circuitry coupling said signal gating device includes a signal inverter means and wherein said signal gating device comprises an OR gate.

References Cited in the file of this patent

UNITED STATES PATENTS

| | | |
|---|---|---|
| 2,641,696 | Woolard | June 9, 1953 |
| 2,749,440 | Cartwright | June 5, 1956 |
| 2,752,489 | Aigrain | June 26, 1956 |
| 2,837,732 | Nelson | June 3, 1958 |
| 2,844,309 | Ayres | July 22, 1958 |
| 2,885,655 | Smoliar | May 5, 1959 |
| 2,907,877 | Johnson | Oct. 6, 1959 |